1,920,743

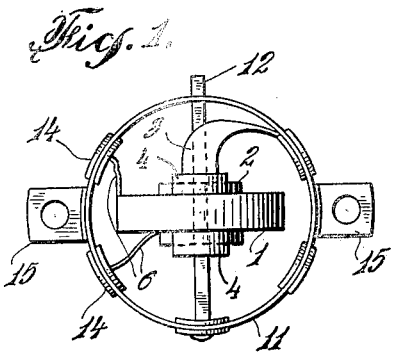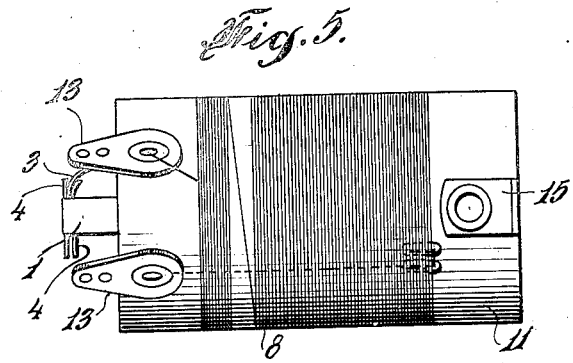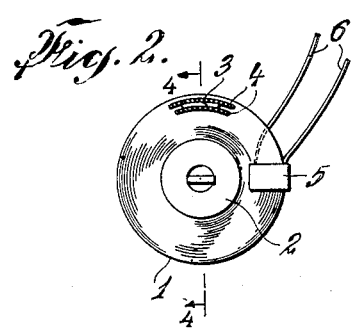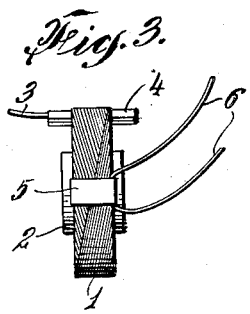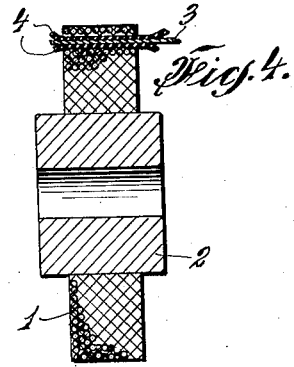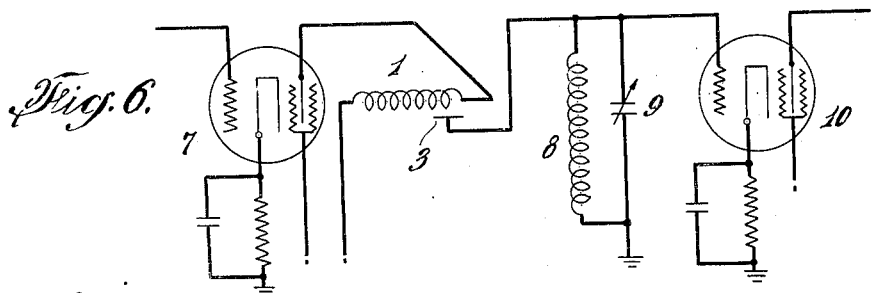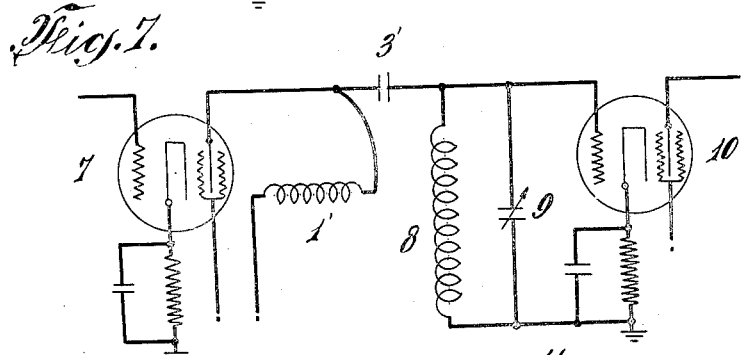
INVENTORS
B.V.K. French
Monte Cohen
BY their ATTORNEY Patented Aug. 1, 1933

UNITED STATES PATENT OFFICE 1,920,743

COUPLING DEVICE

Benedict V. K. French and Monte Cohen, Springfield, Mass., assignors to United American Bosch Corporation, Springfield, Mass., a Corporation of New York Application December 2, 1931. Serial No. 578,462

8 Claims. (Cl. 179—171)

Our invention relates to improvements in coupling devices, and especially to coupling devices for the circuits of radio receiving apparatus.

In its preferred form the coupling device is adapted to unite the amplifying circuits of a radio receiver by the effect of electrostatic capacity.

It is an object of the invention to provide a coupling device having the embodiment of a single unit of efficient but simple mechanical construction, and capable of being easily connected into circuit and accurately controlled to afford the exact amount of capacitance required for successful and correct operation.

A further object of the invention is to provide a coupling device of the capacity type which does not require an extra condenser or any additional turns of wire in capacity-coupled relation; and which is economical, uniform in results and low in radio frequency losses which might otherwise occur.

The nature and scope of the invention are fully set forth in the following description, taken with the drawing; which illustrates a form of our invention; and the novel features are broadly and specifically defined in the appended claims.

On the drawing:

Fig. 1 is a front view of a capacity coupling device in finished state according to our invention; showing also some of the elements of the circuit in which it is to be placed;

Fig. 2 is an elevation of part of what appears in Fig. 1;

Fig. 3 is a side view seen from the left of what is shown in Fig. 2;

Fig. 4 is a section on the line 4—4 on Fig. 2;

Fig. 5 is a side view of the complete device appearing in Fig. 1;

Fig. 6 shows a circuit in which the coupling device is employed; and

Fig. 7 shows an equivalent circuit.

On the drawing the same numerals identify the same parts throughout. Referring first to Figs. 1, 2, 3, 4 and 5, we indicate by the numeral 1 a coil of wire of suitable size and of the required number of turns wound upon a member which may be a bobbin-shaped element of wood or any other suitable insulated material. Between the outer layer of the turns of this coil 1 and the layers beneath we insert a metallic member, such as a brass tab 3, covered on both sides with insulation such as a piece of oiled silk or other material 4. The coil 1 may carry one or more gummed insulating tapes 5 bent into U-shape or clip form to hold the separate wires in place and the lead-in and lead-out terminals are indicated at 6. With this construction a circuit united to the brass tab 3 will be capacitatively coupled to a circuit containing the coil 1; which in practice may be a choke coil in the plate circuit of a vacuum amplifying tube.

A diagram of the connections showing how our coupling capacitor can be put into circuit is shown in Fig. 6. Two vacuum tubes are indicated at 7 and 10. The anode circuit of the tube 7 containing the coil 1 and the brass tab 3; mechanically incorporated into the structure of this coil; as above described; is directly connected to the input circuit of the other tube 10; which also has a tuning circuit containing inductance 8 and capacity 9 in parallel with each other. Hence the capacitance between the brass tab 3 and the turns of the coil 1 constitutes a capacity coupling to the tuning circuit containing the coil 8 and condenser 9. The effect and operation of this circuit is the same as in Fig. 7, wherein the coil 1' is in the output circuit of the first amplifier tube 7, and the output circuit of the tube 7 is coupled to the input of the tube 10 by an equivalent capacity or condenser 3'.

In practice the coil 1 on the bobbin 2 is mounted within a cylindrical insulator 11, on which the tuning coil 8 can be wound. A shaft 12 passing through the bobbin 2 is secured at its ends in the form 11 and supports the bobbin 2 and coil 1. The terminal tabs 13 for the coil 8 are fixed on the form 11 and this form may also carry terminal tabs 14 for the terminals 6 of the coil 1. The brass tab 3 may be attached at one end to one of the tabs 13 so that it is directly connected to the tuning coil 8. One end of the form 11 may have perforated angle-shaped mounting pieces 15 to enable the entire device to be secured to a baseboard or panel.

The capacity element 3 is thus made a part of the mechanical construction of the coil 1 by inserting it between two of the layers of winding thereon. To change the capacity, it is only necessary to alter the width of this strip while keeping the thickness of insulation 4 unchanged. The amount of capacitance can be accurately controlled and kept at the exact value required for correct operation. As pointed out above no additional condenser is needed and no extra turns of wire in capacity-coupled relation to the tuning coil 8 or any other part of the circuit are necessary. The construction is very economical, easy to make; and, when finished, is more uniform in action and reduces possible frequency losses, which might occur when a wire is used in the field of a tuning circuit coil, to a very small value.

Preferably the coil 1 is employed, as shown, at right angles to the coil 8 so that there is no inductive relation between these two coils.

By embedding the tab 3 in the coils 1 the tab is permanently lodged in position and cannot be displaced. Thus, derangement of function of the device is avoided.

We claim:

1. A coupling device for the amplifying stages of a radio receiver, comprising a coil connected to one of said stages and a conductive capacity element insulatably disposed in the windings of said coil connected to another of said stages.

2. A coupling device for the amplifying stages of a radio receiver, comprising a coil connected to the output side of one of said stages, said coil comprising a number of windings in layers and a metallic strip insulatably disposed between two adjacent layers of said coil and directly connected to the input side of another of said stages.

3. A coupling device for the amplifying stages of a radio receiver comprising a coil for the output side of one of said stages, a tuning coil for the input side of another of said stages and a conductive capacity element insulatably disposed in the turns of the first coil and directly connected to a terminal of the second coil.

4. A coupling device for the amplifying stages of a radio receiver, comprising a coil connected to the output side of one of said stages, a member on which said coil is mounted, a form encircling said member, a tuning coil wound on said form connected to the input side of another of said stages, terminal tabs on said form connected to the extremities of the tuning coil, and a metallic strip insulatably embedded between the layers of the first coil and connected to one of the terminals of the tuning coil.

5. A coupling device for the amplifying stages of a radio receiver, comprising a coil connected to the output side of one of said stages, a member on which said coil is mounted, a form encircling said member, a tuning coil wound on said form connected to the input side of another of said stages, terminal tabs on said form connected to the extremities of the tuning coil, and a metallic strip insulatably embedded between the layers of the first coil and connected to one of the terminals of the tuning coil, said member holding the coil thereon out of inductive relation with the tuning coil.

6. A capacity-coupling device comprising a coil and a metal tab insulatably secured in the windings of said coil.

7. A capacity-coupling device comprising a coil, a metal tab insulatably secured in the windings thereof, and a second coil connected to said tab.

8. A capacity-coupling device comprising a coil, a metal tab insulatably secured in the windings of the coil, a second coil connected to said tab, and means for supporting said coils in non-inductive relation.

BENEDICT V. K. FRENCH.
MONTE COHEN.